United States Patent
Wilkes

[15] 3,639,018
[45] Feb. 1, 1972

[54] TAPERED ROLLER BEARING ASSEMBLY

[72] Inventor: Donald F. Wilkes, Albuquerque, N. Mex.
[73] Assignee: Rolamite Incorporated, San Francisco, Calif.
[22] Filed: Oct. 7, 1970
[21] Appl. No.: 78,903

Related U.S. Application Data

[63] Continuation-in-part of Ser. No. 762,013, Sept. 24, 1968, Pat. No. 3,527,295.

[52] U.S. Cl. ............................................................308/214
[51] Int. Cl. .........................................................F16c 19/14
[58] Field of Search ........................................308/214, 209

[56] References Cited

UNITED STATES PATENTS 3,447,849   6/1967   Harris et al. ..........................308/214

*Primary Examiner*—Martin P. Schwadron
*Assistant Examiner*—Frank Susko
*Attorney*—Burns, Doane, Swecker & Mathis

[57] ABSTRACT

A tapered roller bearing assembly in which load-bearing rollers are spaced apart from each other by idler rollers. The idler rollers are supported at their opposite ends in bearing races which are mounted on the outer bearing race for the load rollers. A shoulder adjacent the inner bearing surface for the load rollers cooperates with a conical surface on the end face of the load rollers to urge the load rollers to remain in alignment as they progress around the bearing races.

15 Claims, 8 Drawing Figures

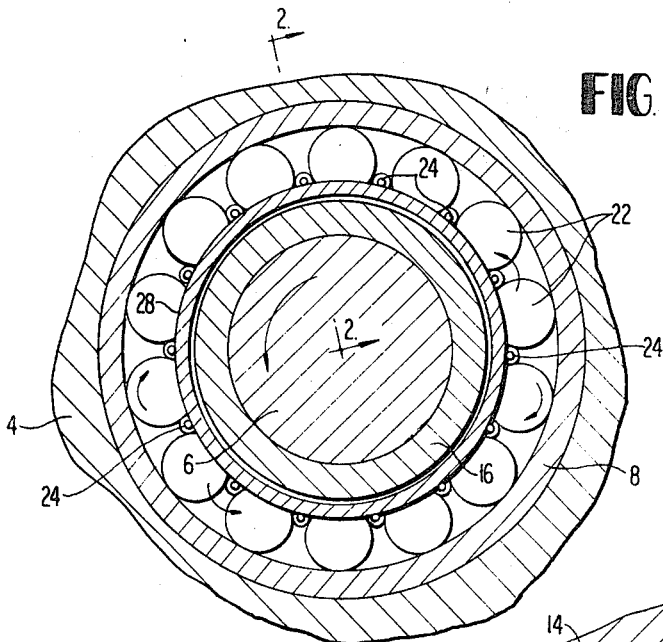
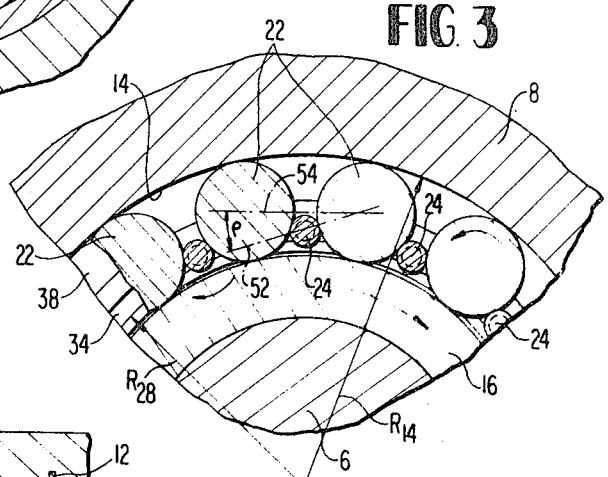
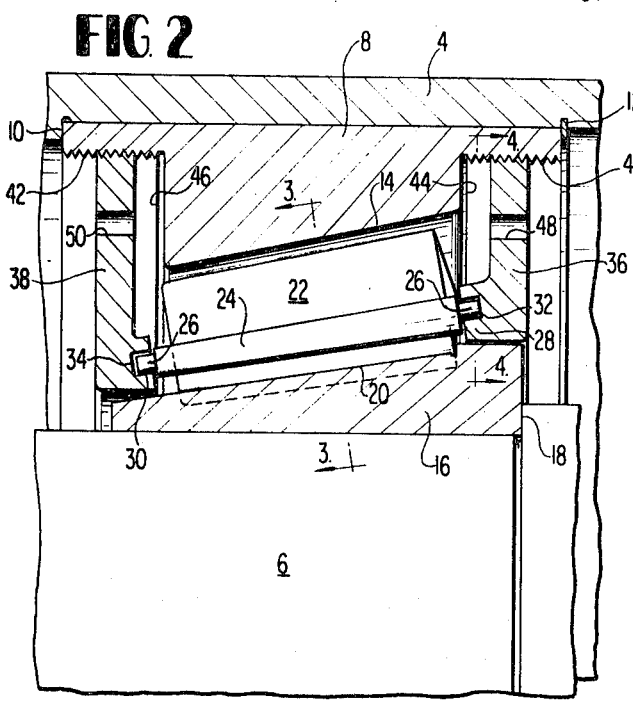
INVENTOR
DONALD F. WILKES

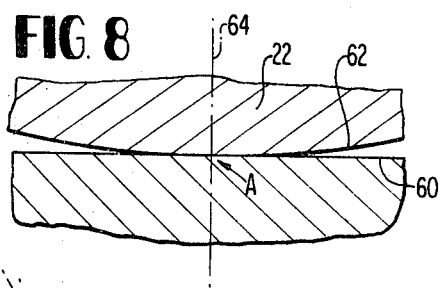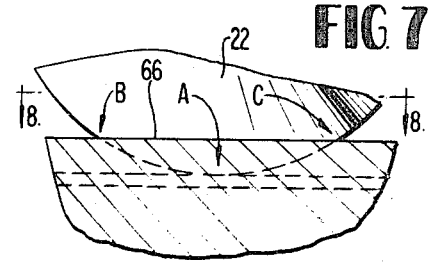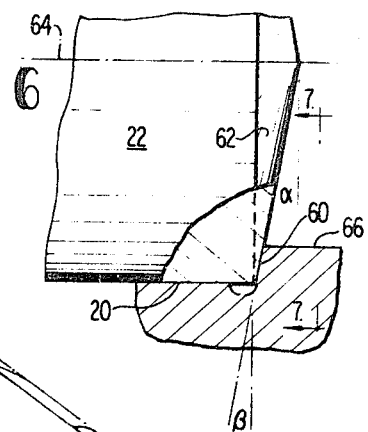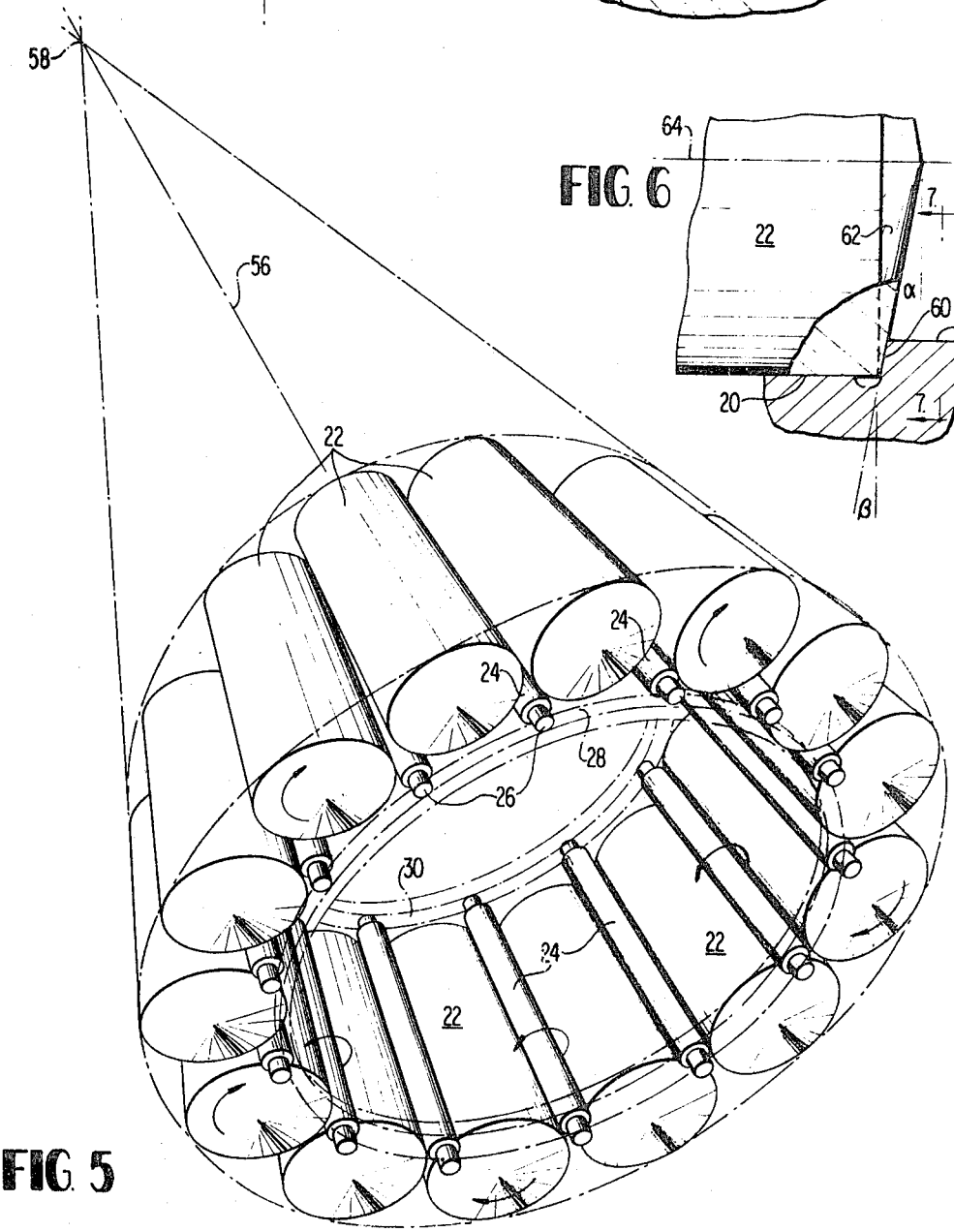

TAPERED ROLLER BEARING ASSEMBLY

CROSS-REFERENCE TO RELATED APPLICATION

This application is a continuation-in-part of my copending application Ser. No. 762,013, filed Sept. 24, 1968, now U.S. Pat. No. 3,567,295 issued Mar. 2, 1971 entitled Linear Recirculating Roller Bearing.

BACKGROUND OF THE DISCLOSURE

This invention relates to rotary bearings and more particularly to roller bearings capable of supporting radial and axial loads.

Conventional roller bearings include bearings in which the rollers are substantially cylindrical for applications in which the applied loads are primarily radial; and bearings in which the rollers are tapered and the bearing races are substantially conical, to allow the bearing to support substantial axial and radial loads. Tapered roller bearings typically include a cage in the form of a thin conical shell with slots for receiving the rollers. The cage maintains the separation between adjacent rollers, but the edge of the cage slots drags on the roller surfaces as the rollers push the cage along while rolling relative to the bearing races. Thus, the cage maintains alignment of the rollers to a reasonable degree, but at the expense of producing frictional drag in the bearing.

Another source of frictional drag in tapered roller bearings is the engagement between the larger end of the rollers and a shoulder adjacent the inner race. Since the rollers are tapered, radial loads tend to urge the rollers in an axial direction toward the larger end of the roller. In a conventional bearing, this axial force on each roller is resisted by a shoulder on the inner race member which bears against the end face of the bearing roller. Various attempts have been made to minimize friction between this shoulder and the roller. A common practice has been to provide on the end face a spherical surface which has a radius of curvature that is slightly less than the distance from the end surface of the roller to the apex of the tapered roller surface. The surface of the shoulder is substantially spherical with its radius centered at the apex of the tapered geometry and projects above the bearing surface about one third the radius of the roller. Consequently, when the roller becomes misaligned while in engagement with the shoulder, the end face scrapes across the shoulder surface. The friction torque imposed on the roller by the engagement between the shoulder and the end of the roller has a lever arm that corresponds to the distance from the center of rolling contact to the point of contact between the roller and the shoulder. As a result, the frictional torque due to misalignment increases appreciably whenever misalignment occurs. Frictional resistance to rotation of the bearing is further affected by the shearing of the fluid-lubricant film that exists between the shoulder and the end of the bearing roller. A viscous lubricant is usually required to support the axial force of the roller without breaking down the lubricant film, but lubricants of high viscosity retard rotation of the bearing rollers.

SUMMARY OF THE INVENTION

In view of the defects of prior art roller bearings, it is an object of this invention to provide improved roller bearings which exhibit less frictional drag.

Another object of this invention is to provide a tapered roller bearing assembly that effectively resists misalignment of the bearing rollers.

A further object of the invention is to provide an improved roller bearing having components that are relatively inexpensive to manufacture and assemble together.

These objects are accomplished in accordance with a preferred embodiment of the invention by a tapered roller bearing assembly which includes inner and outer bearing races which are substantially conical and converge toward a common apex. A plurality of load bearing rollers having substantially the same diameter as the distance separating the bearing races are interposed between the bearing surfaces. Instead of a cage, a plurality of idler rollers are positioned between adjacent pairs of load rollers. The idler rollers have a smaller diameter than the load rollers and the path of the central axis of the idler rollers progress along a path having a smaller diameter than the path of the central axes of the load rollers. Auxiliary bearing races are engaged by the idler rollers to maintain the idler rollers spaced from the inner bearing race. The bearing assembly also includes a shoulder adjacent the inner bearing surface for restricting axial movement of the load rollers. Each load roller has a substantially conical end surface and the shoulder is also conical, so that the end surface of the roller and the shoulder roll relative to each other although the load roller may be misaligned.

DESCRIPTION OF THE DRAWINGS

This preferred embodiment is illustrated in the accompanying drawings in which:

FIG. 1 is a cross-sectional view of a tapered roller bearing in accordance with this invention;

FIG. 2 is an enlarged cross-sectional view of the bearing along the line 2—2 in FIG. 1;

FIG. 3 is an enlarged cross-sectional view of the bearing along the line 3—3 in FIG. 2;

FIG. 4 is a cross-sectional view of the bearing along the line 4—4 in FIG. 2;

FIG. 5 is a schematic view of portions of the bearing in accordance with this invention;

FIG. 6 is an enlarged detail view showing the inner race shoulder and a load roller;

FIG. 7 is a cross-sectional view along the line 7—7 in FIG. 6; and

FIG. 8 is a cross-sectional view along line 8—8 in FIG. 7.

DESCRIPTION OF PREFERRED EMBODIMENT

Referring to FIGS. 1 and 2, the tapered roller bearing assembly 2 is illustrated as being mounted in a stationary housing 4 and supporting a rotary shaft 6.

An outer ring member 8 has an outer cylindrical surface which is received within the housing 4 and the end of the ring 8 abuts a shoulder 10 in the housing 4. Displacement of the ring 8 away from the shoulder 10 is resisted by a conventional snap ring 12, or other conventional means. The outer ring 8 includes an outer bearing race surface 14, which is substantially frustoconical.

A cone member 16 is secured on the shaft 6 and the end of the cone member abuts a radial shoulder 18 on the shaft to resist axial displacement. The cone member 16 has a frustoconical inner bearing surface 20.

The bearing surfaces 14 and 20 form outer and inner bearing races for a plurality of load rollers 22 which are spaced apart from each other around the circumference of the bearing assembly. An idler roller 24 is interposed between each pair of load rollers, as shown in FIGS. 1 and 3. The idler rollers 24 have trunnions 26 at opposite ends which are supported by bearing surfaces 28 and 30 provided in circular grooves 32 and 34 formed in end plates 36 and 38. The sides of the grooves 32 and 34 that are opposite the bearing surfaces 28 and 30 should be spaced from these bearing surfaces a distance greater than the maximum diameter of the trunnions 26, so that the trunnions normally engage only the surfaces 28 and 30 when the bearing is rotating under load. The end plates are substantially circular and each is provided with peripheral screw threads which cooperate with axially extending threaded portions 40 and 42 formed in counterbores 44 and 46 at opposite ends of the housing 8. A plurality of sockets 48 and 50 are provided on each end plate to receive a wrench for rotating the end plates and thereby advancing the end plates axially along the threaded portions 40 and 42, respectively. If desired, a wrench spanning the outer ring member 8 may be applied in both sockets 48 and 50 simultaneously to allow axial adjustment of the position of the bearing surfaces 28 and 30 relative to the inner and outer bearing races 14 and 20.

The relationship between the bearing rollers and the idler rollers is shown in FIG. 3. A straight line that is perpendicular to the central axis of the roller 22 and intersects the central axis of the adjacent roller 24 as indicated at 52. Another straight line that is perpendicular to the axis of the same bearing roller and intersects the first line 52 and also intersects the central axis of the adjacent bearing roller is indicated at 54. The included angle between the lines 52 and 54 is the pressure angle, which is designated rho($\rho$). The pressure angle should be less than 15° in order to assure that the normal force at the surfaces of the respective rollers that are in contact with each other is sufficiently great to prevent relative sliding between these surfaces. For steel rollers that are lubricated, so that the coefficient of sliding friction is between 0.15 and 0.25, the pressure angle is preferably about 13°. The pressure angle also affects the proportion of circumferential forces that are transmitted from one load roller 22 to the adjacent load roller through the idler roller. Preferably, at least 85 percent of the circumferential force should be transmitted to the adjacent load roller and only 15 percent, or less, should be supported by the radial reaction of the auxiliary guide surfaces 28 and 30 on which the trunnions 26 of the idler roller bear.

As shown in FIG. 5, the various conical surfaces of the bearing assembly including the idler rollers are concentric about a common axis 56 and converge toward a common apex 58. Consequently, when all of the rollers are in alignment, pure rolling motion occurs between the rollers and the respective bearing surfaces. It is necessary for the rollers and bearing surfaces to have the proper size relationships that will avoid sliding relative to each other and relative to the bearing surfaces as the rollers progress around the races. If the rollers and bearing surfaces were cylindrical, it would be sufficient to define the proper size relationship by stating that the ratio of the outside diameter of the idler roller to the diameter of the trunnions on the idler roller must be equal to the ratio of the diameter of the outer race for the load rollers to the diameter of the trunnion race. This relationship can be translated to the conical system that is illustrated in the drawings by well-known mathematical techniques to provide the proper dimensions for the rollers and races to achieve substantially pure rolling motion. Since the trunnions 26 have a small taper in relation to the size of the other conical surfaces and have a short length, the taper may be approximated by a cylindrical surface.

Alignment of the load roller 22 while progressing around the bearing races is maintained by a shoulder 60 adjacent the inner race 20 which is in position to be engaged by the end face 62 of the respective rollers 22. The cone angle of the end face 62 with respect to a radius from the central axis 64 of the bearing roller 22, as indicated by the angle alpha in FIG. 6, is preferably between ½° and 5°, but may be slightly larger depending upon the conditions of operation of the bearing assembly. Since the roller 22 is tapered, the angle that the surface 62 makes with respect to a perpendicular line from the bearing surface 20 is the sum of the cone angle alpha and one-half the taper angle of the roller. This angle will be referred to as angle beta ($\beta$). Typically, the roller 22 would have a taper of about 4° and accordingly the angle beta (FIG. 6) is preferably between 2½° and 7°. The guide surface 60 has an angle of inclination (cone angle) relative to the surface 20 which is normally equal to the angle beta, and may be of the order of 1° greater than the angle beta. The taper angle of the bearing rollers 22 urges the rollers axially toward the shoulder 60. When the central axis 64 is in alignment with its desired position, the conical surface 62 engages the shoulder 60 in aligned contact at the region marked A in FIG. 7 and FIG. 8. The spacing between the conical portion 62 of the bearing roller 22 and the conical shoulder 60 increases progressively on opposite sides of the region marked A, with the maximum separation occurring at the point where the periphery of the end surface 62 is intersected by the plane of the outer surface 66 on the inner bearing member 16, which is indicated at B and C in FIG. 7 and 8.

If the central axis of the bearing roller 22 should tend to swing circumferentially, so that it is no longer aligned with its desired position, the region of contact between the conical surface 62 is displaced progressively from the region marked A toward the region marked B or C, depending upon the direction of angular misalignment. When this occurs, torque is applied by the sloping shoulder 60 at a progressively greater distance from the line of contact between the bearing roller 22 and the inner bearing surface 20.

In normal operation when a combination of radial and axial loads are applied to the bearing, the load rollers and idler rollers are tightly packed together. The contact force between adjacent rollers is sufficient to prevent slippage between the rollers. As the rollers progress around the races due to relative rotation of the races, the side of the bearing against which the radial load is applied tends to deflect under load, so that the radial spacing between the inner and outer races is slightly less on the loaded side than it is on the unloaded side of the bearing. The curvature of the bearing races along the loaded side of the bearing tends to urge the rollers into alignment. Since the rollers are tightly packed in the races, adjustment of alignment occurs gradually. When the bearing is operating under steady loading, after being run long enough to allow impending forces to adjust themselves to minimum stored energy state, the effective contact location returns to the location A.

Since the conical surfaces 62 on the respective rollers 22 engage the sloping surfaces 60 in rolling contact while the roller axes are in alignment with the desired position, and since there is a gap normally provided at the points B and C, any foreign matter, such as dust or dirt particles which should enter the space between the cooperating surfaces, does not seriously interfere with the guiding action of the surfaces. Also, because of the predominantly rolling contact between the surfaces 60 and 62, there is very little tendency for wear. A small additional amount of sliding occurs between the surfaces when the rollers are misaligned, but the amount of sliding is so slight that the resulting wear is negligible. An important effect of the geometrical relationship between the straight guide surface 60 and the conical surface 62 on each roller 22, is that lubricating oil in the space between the surfaces is subjected to very little shear and therefore the viscosity of the lubricating oil does not adversely affect the total frictional drag of the bearing. Also, the manner of engagement exhibits a low angle of entrance wedge which is very effective in establishing and maintaining a viscous film. This permits the use of oil of relatively low viscosity, which further reduces drag to the the presence of lubricants.

The height of the upper surface 66 of the shoulder 60 relative to the inner bearing race 20, of course depends upon the sizes of the various components of the bearing assembly, but the height should be kept relatively low, in order to minimize whatever frictional or viscous drag might occur. On the other hand, if the height of the shoulder 60 is too low, the actual area of contact under load might not be adequate and the shoulder might break off. The shoulder angle $\beta$ and roller angle $\alpha$ must be large enough to accommodate misalignment of the central axis of the bearing rollers 22 of between 1° and 2° which permits assembly, tightening, and slight misalignment during running without damaging the shoulder 60. This has been found to be sufficient for bearings in which the average radius of the path of the central axes of the load-bearing rollers is between 1 and 2 inches.

The bearing components may be readily assembled together by rotating the end plates 38 until they are screwed to the extreme right end of the threads 40 ad 42, as viewed in FIG. 2. The distance between the bearing surfaces 28 and 30 should correspond to the length of the idler rollers, so that the trunnions will be properly seated in the grooves 32 and 34. The idler rollers may be magnetized to facilitate assembly. All of the idler rollers are installed in the bearing with the trunnions of the idler rollers inserted in the grooves. The idler rollers maybe temporarily grouped on one side of the bearing. The load rollers are then inserted between each pair of idler rollers. There is sufficient space between the idler rollers to insert the load rollers because the idler rollers are displaced toward the right, as viewed in FIG. 2, and the load rollers can be displaced outwardly against the outer race 14 to allow all of the idler rollers 24 around the circumference of the bearing to be moved toward each other. Thus, the remaining space is large enough to insert the last load roller.

After the load rollers have been installed, the end plates 36 and 38 are rotated simultaneously by a wrench or other means, using the holes 48 or other features provided for this purpose, thereby displacing the load rollers and the idler rollers to the position shown in FIG. 2. The cone member 16 is then inserted, with the surface 20 engaging the load rollers 22. In this position sufficient preload is applied between the respective rollers to assure that sliding will not occur between the load rollers and the idler rollers. Preload is also important to provide sufficient force for maintaining the end face 62 of each roller in engagement with the shoulder 60. When properly preloaded in this manner, the load rollers progress around the bearing races as if they were a continuous ring and there is no tendency for the rollers to move apart from each other as they pass through the radial position at which the load is applied on the bearing.

Typically, the bearing rollers 22 are manufactured to have a slightly larger diameter midway of their length, which may be described as being generally barrel shaped. This reduces the stresses near the ends of the load rollers. Since the idler rollers 24 have a relatively small diameter in relation to their length, they are capable of flexing to accommodate variations of shape of the bearing rollers along their length.

In operation, rotation of the shaft 6 causes the inner ring member 16 to rotate relative to the outer member 8. Assuming a clockwise rotation of the inner race 16, as viewed in FIG. 3, the bearing rollers 22 rotate in a counterclockwise direction and progress along the races in a clockwise direction. The idler rollers 24 rotate in a clockwise direction, since they are in engagement with the bearing rollers and roll along the auxiliary bearing surfaces 28 and 30.

Since the conventional cage for the bearing rollers has been eliminated, it is possible to use a greater number of load rollers for a bearing of the same size, thereby increasing the capacity of the bearing. Elimination of the cage also reduces the noise and difficulties of assembly.

It has been found that the tapered roller bearing of this invention is particularly suitable for combined radial and axial load conditions and in comparison with conventional cage-type bearings the frictional torque is reduced considerably. Also, the friction torque remains substantiaLly constant during each revolution of the inner race, since the rollers do not tend to jam in passing through the load zone, as they frequently do in conventional bearings.

While this invention has been illustrated and described in connection with a preferred embodiment, it is recognized that variations and changes may be made therein without departing from the invention as set forth in the claims.

I claim:
1. A roller bearing assembly comprising:
 a. outer bearing race means and inner bearing race means, said inner and outer race means each having a substantially frustoconical bearing surface,
 b. a plurality of load rollers interposed between and in engagement with both of said bearing surfaces,
 c. a plurality of idler rollers interposed between adjacent pairs of load rollers, said idler rollers having a smaller diameter than said load rollers at corresponding axial locations,
 d. auxiliary race means supporting opposite ends of said idler rollers for rolling with said load rollers, the path of the central axes of said idler rollers being spaced toward the center of said bearing assembly relative to the path of the central axes of said load rollers while rolling along said bearing surfaces, and
 e. abutment means adjacent said inner bearing surface for restricting axial movement of said load rollers.

2. A roller bearing assembly according to claim 1 wherein said load rollers and said idler rollers are tapered.

3. A roller bearing assembly according to claim 1 wherein the pressure angle between load rollers and adjacent idler rollers is less than 15°.

4. A roller bearing assembly according to claim 1 wherein said idler rollers have trunnions at opposite ends, said trunnions being in engagement with said auxiliary race means, said trunnions having a smaller diameter than the diameter of the idler rollers between said opposite ends.

5. A roller bearing assembly according to claim 2 wherein said abutment means includes a shoulder projecting outwardly from said inner race surface in position to be engaged by the larger end of said load rollers, said shoulder being inclined away from a radial plane of said load rollers by an angle of less than 5°.

6. A roller bearing assembly according to claim 2 wherein said bearing surfaces and said roller surfaces converge at an imaginary apex.

7. A roller bearing assembly according to claim 2 including means for adjusting the axial position of said auxiliary bearing means relative to said outer bearing surface.

8. A tapered roller bearing assembly comprising:
 a. outer bearing race means and inner bearing race means, said inner and outer race means each having a substantially frustoconical bearing surface,
 b. a plurality of load rollers interposed between and in engagement with both of said bearing surfaces,
 c. a plurality of idle rollers interposed between adjacent pairs of load rollers,
 d. means urging said idler rollers, said load rollers and said surfaces into engagement with each other,
 e. said load rollers being substantially frustoconical and being urged toward one end in response to radial compression between said inner and outer bearing surfaces,
 f. said inner race means having a shoulder extending around the circumference of said bearing surface in position to be engaged by said one end of said load rollers, said load rollers having a conical end surface intersecting the circumference of said rollers, said shoulder being substantially frustoconical and projecting outwardly from said bearing surface at a cone angle that is substantially equal to the sum of the cone angle of said load rollers end surface and one-half the taper of said load roller, whereby said shoulder urges said load roller to remain in alignment while rolling along said bearing surfaces.

9. A tapered roller bearing assembly according to claim 8 wherein the cone angle of said shoulder is between 2½° and 7°.

10. A tapered roller bearing assembly according to claim 8 wherein said conical end surface of said load rollers has a cone angle of between ½° and 5°.

11. A tapered roller bearing assembly comprising:
 a. outer bearing race means and inner bearing race means, said inner and outer race means each having a substantially frustoconical bearing surface,
 b. a plurality of tapered load rollers interposed between and in engagement with both of said bearing surfaces,
 c. a plurality of tapered idler rollers interposed between adjacent pairs of load rollers, said idler rollers having a smaller diameter than said load rollers at corresponding axial locations and having trunnions at opposite ends,
 d. auxiliary race means supporting the trunnions of said idler rollers for rolling with said load rollers,
 e. said inner and outer bearing surfaces and said tapered load end idler rollers being convergent toward an imaginary common apex, said idler rollers and said load rollers rotating relative to each other and said trunnions rotating relative to said auxiliary race means without substantial sliding upon rotation of one of said bearing surfaces relative to the other of said bearing surfaces.

12. A tapered roller bearing assembly according to claim 11 wherein said auxiliary race means is secured on said outer race means, said auxiliary race means includes a frustoconical bearing surface adjacent opposite ends of said idler rollers, said auxiliary bearing surfaces being coaxial with said outer bearing surface and converging toward said common apex.

13. A tapered roller bearing assembly according to claim 12 wherein said idler rollers have a shoulder adjacent said trunnions, the length of said idler rollers between said shoulders being less than the distance separating said auxiliary bearing surfaces, whereby said roller shoulders restrict endwise movement of said idler rollers.

14. A tapered roller bearing assembly according to claim 13 including abutment means on said inner bearing race means for restricting axial movement of said load rollers.

15. A tapered roller bearing assembly according to claim 13 including means for adjusting the axial position of said auxiliary bearing surfaces relative to said outer bearing surface.

* * * * *